Patented Jan. 6, 1953

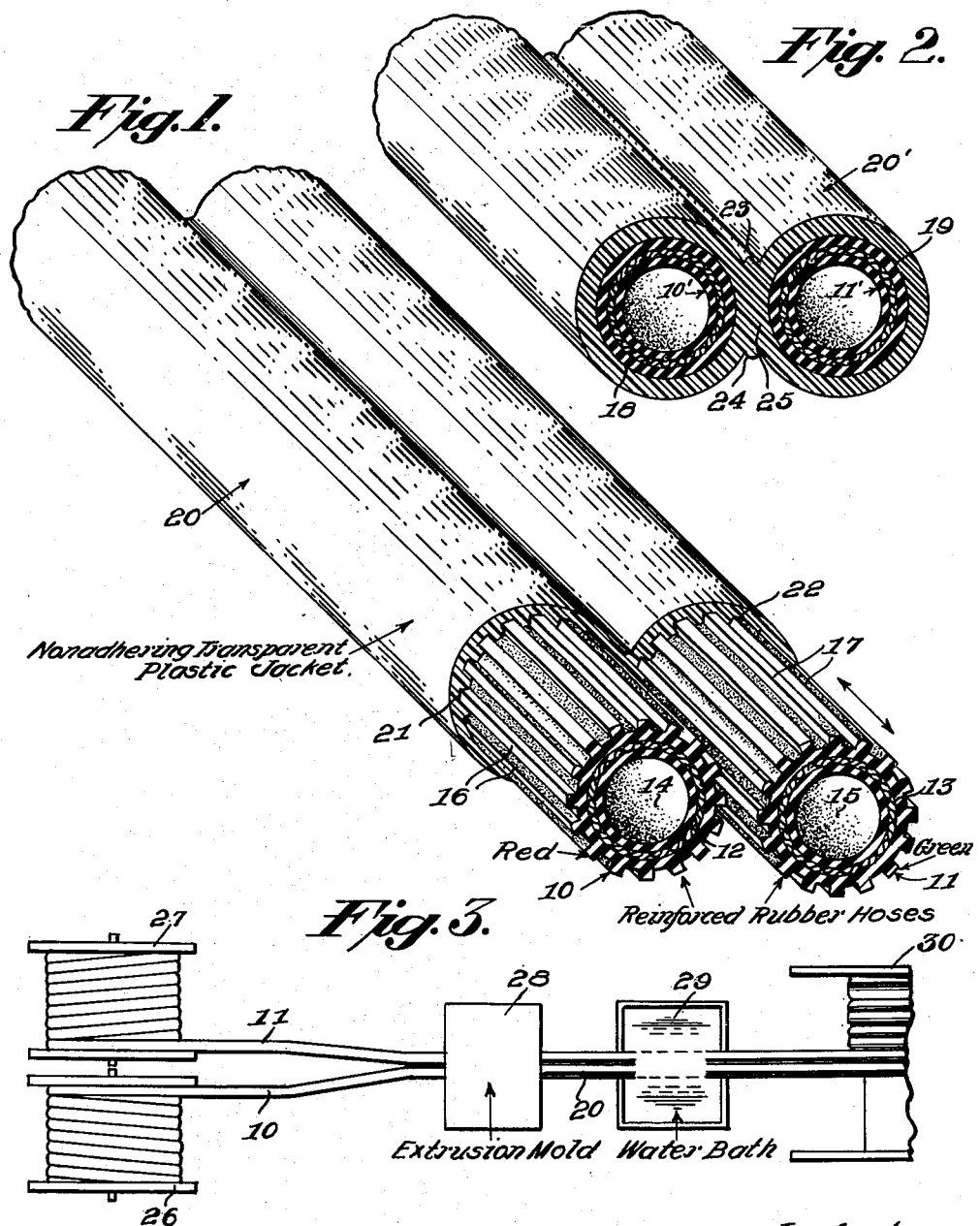

2,624,366

UNITED STATES PATENT OFFICE 2,624,366

PLURAL HOSE

William J. Pugh, Piedmont, Calif.

Application July 22, 1952, Serial No. 300,153

5 Claims. (Cl. 138—87)

This invention relates to improvements in plural or multiple passage hose construction whereby the handling of such articles of desired or indefinite lengths by workmen is facilitated and the uses to which it may be employed are thus greatly increased.

The invention was first fully shown, described and claimed in my co-pending application, Serial No. 112,475, filed August 26, 1949, now abandoned.

Such a multiple passage hose is usually employed to conduct gases and fluids of different character, at different pressures and for different purposes from separate sources to a common delivery point. For example, in gas welding where long lengths of such hose are usually required, the oxygen and the actylene gas are each conducted from their respective supply tanks to a remote welding torch. A separate and well isolated conduit is required for each such gas and the mixing for combustion is done at the torch.

It will be readily seen that for such uses a plural hose of the general type herein shown and comprising two or more hoses or conduits secured together has been found to be preferable to a plurality of separate single hoses, in that these hoses which are generally of great lengths must extend to a single point for use as a unit, and must be easily handled and useable without twisting, snarling and/or tangling.

Aside from the use of separate single hoses, all other types of plural or multiple passage hoses heretofore known, have had much the same serious disadvantages, for instance: One prior type of plural hose, used for the above described purposes, has been made by cementing and/or vulcanizing separate hoses directly to each other and from end to end thereof. Such a resulting plural hose structure may obviously be handled as a unit in great lengths without undue snarling and tangling until the gases are introduced into the separate passages thereof at the pressures required at the delivery end thereof. Under such operating conditions, however, the hose lengths have at times come apart and become tangled because of the necessarily long and narrow line of juncture therebetween. Obviously, such a structure has failed to give satisfactory results in conducting different gases under varying pressures with the required long lengths thereof.

A second known type of plural hose tested for such use and comprising separately preformed hose lengths is held together at relatively closely spaced intervals by metal bands or ferrules of relatively rigid material. Under normal operating conditions which may be considered to be generally similar to those previously stated, the projecting edges of the relatively rigid ferrules tend to catch onto any extending or projecting edge portions making handling and feeding of the plural hose difficult. The necessary spaced relation of such ferrules leaves unattached lengths therebetween which in use writhe about and twist under extension from internal pressure causing snarling and tying up of such portion. Such ferrules have also caused crimping, cutting and other physical damage to the hoses when too tight. However, when too loose the ferrules are caused to creep and extend the unjoined portions of hose lengths to such extent that they become fouled up with projecting mechanisms as well as snarled and tangled.

A third type of plural hose comprises an integral structure having separate passages therethrough. Such a structure is usually composed of two or more slightly spaced, parallel inner tubes or lengths of rubber each having an exterior reenforcing covering of textile fabric cemented thereto and a single relatively thick outer layer or covering of rubber molded thereon as a unit completely around each of the fabric covered tubes and vulcanized thereto as a one-piece multiple hose. Obviously, there are many problems in the economical manufacture of such a vulcanized unitary structure. One important problem is how to properly cure the inner tubes when applying the heat necessary to vulcanize the outer layer to the fabric coverings of the tubes. While such a unit structure is stronger than the separate connected plural hose structures, of types one and two (described above), and as easy to handle and feed to a desired location for use, it is nevertheless subject to twisting, snarling and consequent tangling with everything in its path when unequal fluid pressures are developed within the separate passages of the integral rubber structure because of the unitary structure.

The integral multiple passage hose has a further disadvantage in use, in that it is difficult to separate the outer relatively heavy and thick rubber casing or layer from the inner integrally vulcanized tube portions at any required point therealong when it is necessary to make separate connections with the separate tube sections thereof.

A still further disadvantage of a unitary, molded multi-passageway structure of this character is that it has not been possible to determine quickly, and from a mere examination of the outer surface of the structure, which passageway concealed therein is being used for what purpose. In an attempt to correct this situation it has been proposed to construct the inner rubber tubes and/or the fabric coverings therefor of differently colored materials. But in such instances it is either necessary to mutilate and weaken the hose structure at any point therealong where this information is desired or to inspect the ends of the hose where the colors may be observed.

The present invention solves all of the problems above enumerated by providing an inexpensive, light weight reenforced plural hose from preformed complete hose lengths of different colors and having full strength wall construction. The differently colored hose lengths are then securely held in adjacent parallel, non-rotative, yet relative longitudinally extensible relationship at every point throughout their length by a single transparent, light weight inextensible and inexpansible jacket, through which every portion of the encased hoses are always visible. Hence, approved lengths of preformed hoses produced from standard materials readily available on the market are employed for the manufacture of the instant improved plural hose and with only a minimum of special equipment. Moreover, the present hose may be made in as long lengths as desired and may be cut at any point required and according to the distinctive designating coloration of the hose and at the point of use.

A further object of my invention is to provide a multiple house structure in desired lengths in which a plurality of lengths of individual preformed hoses having axially extending corrugations thereon are jointly supported in correspondingly corrugated, transparent, inexpensive jacket walls for free stretching movements axially of each other, but in which jacket walls the respective hose elements cannot twist or writhe because of the radial interlock between the corrugations on the hose and the complementary mating surface on the inside of the jacket walls.

The outer surface of the elastic hoses and the inner walls of the inextensible and inexpansible jacket are in frictional relatively movable and/or slidable engagement.

Other objects and advantages of the invention will appear from the following description of a preferred and modified form thereof, taken in connection with the accompanying drawing, wherein:

Fig. 1 is a broken, transverse sectional isometric view showing portions of the hoses unequally extended from the plane of section of the unbonded connection with the jacket;

Fig. 2 is a view similar to Fig. 1 of a modified embodiment of the invention with the sectioned ends of the hoses and jacket in the same plane; and Fig. 3 is a diagrammatic plan view disclosing a method by which the article may be formed.

Referring now to the preferred form of the invention shown in detail in Fig. 1, it will be noted that the plural passage hose there illustrated is produced from two lengths of standard rubber hose such as may be purchased in the open market. Further, that in accordance with accepted and now standard practice one of said "two" hoses is colored red, whereas the other is green. If one or more additional hoses were added to this plural hose or passageway structure it is obvious that such additional hose or hoses would be of colors contrasting with that of the said usual "two" hoses, as a quick and safe means of identifying each.

Irrespective of the number of hoses employed in a required plural hose structure (see Fig. 1), each said hose unit 10 and 11 will comprise a preformed length of rubber hose, the wall structures of which are usually fabricated with intermediate reenforcing layers of fabric 12 and 13. The interior cylindrical walls 14 and 15 of these standard type hoses 10 and 11 are preferably smooth but as shown, the exterior walls are preferably longitudinally ribbed, as indicated at 16 and 17. It is also quite common to provide such hose lengths of rubber in a desired color and with a longitudinally ribbed or other roughened exterior wall. In the instant case, however, the provision of longitudinal ribs on the exterior cylindrical surface of the hoses is for a purpose later to be described.

The type and character of hoses employed in the plural hose structure of Fig. 2, may be identical in every respect with that shown in Fig. 1, except that the exterior surfaces 18 and 19 are smooth instead of ribbed and grooved.

In each of the forms of Figs. 1 and 2 the plural hose includes a pair of preformed, standard hose elements 10 and 11, 10' and 11' respectively which are retained in uniform slightly spaced parallel relationship throughout their length by enclosing jackets 20 and 20' respectively of transparent, inextensible, light-weight plastic material.

In the case of the preferred form of Fig. 1, the configuration of the inner surfaces 21 and 22 of the parallel, tubular wall portions of the jacket 20, corresponds exactly with the outer ribbed surfaces 16 and 17 of the respectively supported hose lengths 10 and 11. In Fig. 2 the meeting rubber surfaces 18 and 19, with the interior cylindrical walls of the plastic jacket 20' are all smooth.

These unitary coverings or jackets 20 and 20' may suitably be formed from vinyl resin which will not only desirably retain the plurality of hose elements in parallel uniform spaced relation at every point throughout their length, but will also form a strong protecting inexpansible sheath, which reenforces the tubular wall structures of the rubber hoses and prevents abrasion thereof, prevents softening and damage from oil, grease and other attacking agents; clearly shows through the clear, unitary, transparent wall structure the distinguishing character and physical condition of every portion of each hose element; permits relative longitudinal extension and/or creeping of the respective hose elements inside the sheath, (indicated by the double headed arrow in Fig. 1), and provides close supporting engagement without adherence and bonding with the surface areas of the respective hoses.

As will be understood from the above description of parts in reference to the preferred form, the separately supported and encased hoses 10 and 11 are restrained against twisting and turning movements within the jacket 20 by the interengaging and cooperating ribs and valleys of the surfaces 16 and 17 with the opposed surfaces 21 and 22. These cooperating rib and valley portions being of different non-bonding materials provide smooth guideways for such relative longitudinal movement but will prevent angular displacement of these parts in use.

In the form of Fig. 2, like that in Fig. 1, the separately supported hoses 10' and 11' may individually stretch and thereby extend longitudinally of the axis thereof and relatively to the jacket 20' under varying conditions of internal pressure, etc. In certain body constructions of hose and for specific uses it has been found that such hoses having a smooth or plain outer surface may be satisfactorily incorporated into a non-bonding plastic jacket arrangement as shown in Fig. 2. Such an arrangement of parts will of course permit relative movements in both longitudinal and rotative directions.

To further strengthen the structure of Fig. 2 against relative twisting movements and possible separation and other damage therefrom, the molded jacket of Fig. 2 is shown as formed with integral reenforcing beads 23 and 24 which are disposed at the juncture of the cylindrical wall portions of the jacket and extend outward from the central longitudinal web portion 25, of the jacket.

While the drawings show the structures in somewhat enlarged form, for clearness of detail, it will be understood that in normal use the average plastic jacket thickness will be from 3/64 to 1/16 of an inch thickness with the connecting web portion 25 about 1/4 of an inch. However, as above explained, the plastic from which the jacket 20 is made is preferably a material which is incompatible with the rubber or plastic from which the preformed hoses 10 and 11 are made, so that no bonding occurs when the jacket 20 is molded about the hoses. The plastic jacket 20 will shrink slightly when treated in a water bath and will then freely but firmly hold the hoses 10 and 11 in desired operative relationship. By this construction the jacket 20 may be severed and/or cut away wherever desired and the standard hoses 10 and 11 may then be separated quite easily, or connections made therewith as desired or required.

As is indicated diagrammatically in Fig. 3, the plural hose above described and comprising two or more lengths of standard rubber hose supported in adjacent parallel relationship, in a unitary and seamless, transparent jacket, may be produced in a plastic extrusion mold.

In the method and apparatus generally indicated the first step is to align the hoses 10 and 11 fed from reels 26 and 27 so that they are adjacent one another but preferably do not quite touch. Then they are passed into an extrusion mold 28 having the desired conformation. There the transparent thermoplastic material (e. g. vinyl resin) is flowed completely around the hoses 10 and 11 under required pressure and heat conditions and molded thereon to form the unitary jacket 20.

From the extrusion mold 28, the jacketed hoses 20 may pass through a tank of water 29 where the jacket 20 is cooled, and shrunk into the final shape. Other treating steps may be employed according to the type of jacket desired and the type of plastic employed for the jacket 20. The treated product may then be wound on a reel 30 for later distribution in long coils or for later cutting to shorter lengths.

It will be seen that this method provides for the continuous manufacture of twin hose in lengths as long as the single hoses from which they are made. It also should be noted that the single hoses 10 and 11 employed may be selected from the open market to meet special requirements as practically any type of finished hose is suitable for the process described, and the jacket 20 may be made from a variety of suitable materials provided the resultant product will be light in weight yet strong and inexpensive to produce and maintain.

To those skilled in the art it will be obvious that various changes may be made beyond what is shown and described herein without departing from the spirit and scope of the invention as covered by the appended claims.

I claim:

1. A plural hose construction comprising a plurality of juxtaposed parallel fluid conducting elastic rubber hoses, a relatively thin inelastic jacket enclosing said hoses, the inner wall of said jacket firmly engaging the outer walls of said hoses and being slidable relative thereto for relative creeping movement between the jacket of the hoses under the action of variable fluid pressures in the hoses.

2. A plural hose construction comprising a plurality of juxtaposed parallel fluid conducting elastic hoses having visibly distinguishable outer surfaces, a relatively thin transparent inelastic jacket surrounding said hoses, the inner wall of said jacket firmly engaging the outer walls of said hoses and being slidable relative thereto for relative creeping movement between the jacket and the hoses under the action of variable fluid pressures in the hoses.

3. A plural hose construction comprising a pair of juxtaposed parallel fluid conducting elastic rubber hoses having their adjacent outer wall portions in spaced relation, an inelastic jacket including a pair of cylindrical portions united by a unitary web disposed between said adjacent outer wall portions of the hoses, the inner walls of said cylindrical portions firmly and slidably engaging the outer walls of the hoses for relative creeping movement between the hoses and jacket under the action of variable fluid pressures in the hoses.

4. The structure according to claim 3, together with a pair of reenforcing beads projecting outwardly from said jacket and aligned with said web.

5. A plural hose construction comprising a plurality of juxtaposed parallel fluid conducting elastic hoses, a relatively thin and relatively inelastic jacket surrounding and firmly embracing said hoses, the opposed walls of said hoses and said jacket being provided with longitudinally extending interengaging ribs and valleys whose cooperating surfaces are relatively slidable longitudinally of the hoses for relative longitudinal creeping movement between the hoses and the jacket under the action of variable fluid pressures in the hoses.

WILLIAM J. PUGH.

No references cited.